J. KOWALSKY.
BENCH DRILL.
APPLICATION FILED AUG. 7, 1915.
1,198,854.
Patented Sept. 19, 1916.
3 SHEETS—SHEET 3.
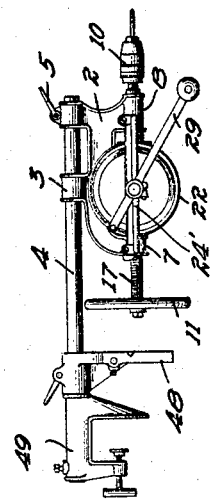
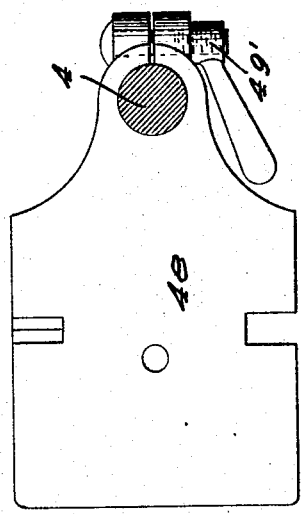
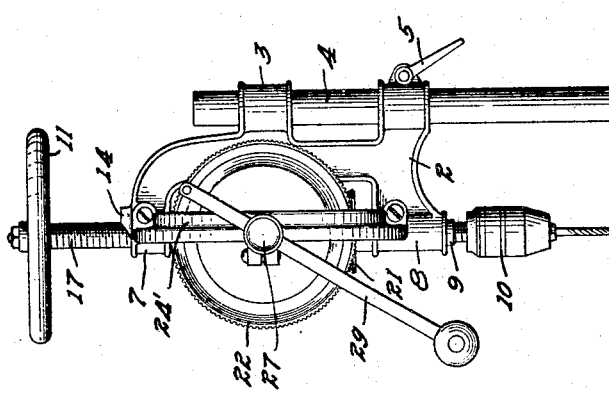
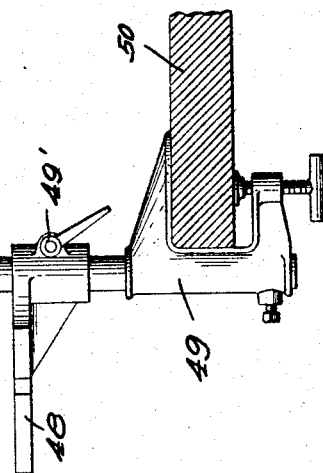
WITNESSES
INVENTOR
JOHN KOWALSKY
BY
ATTORNEYS

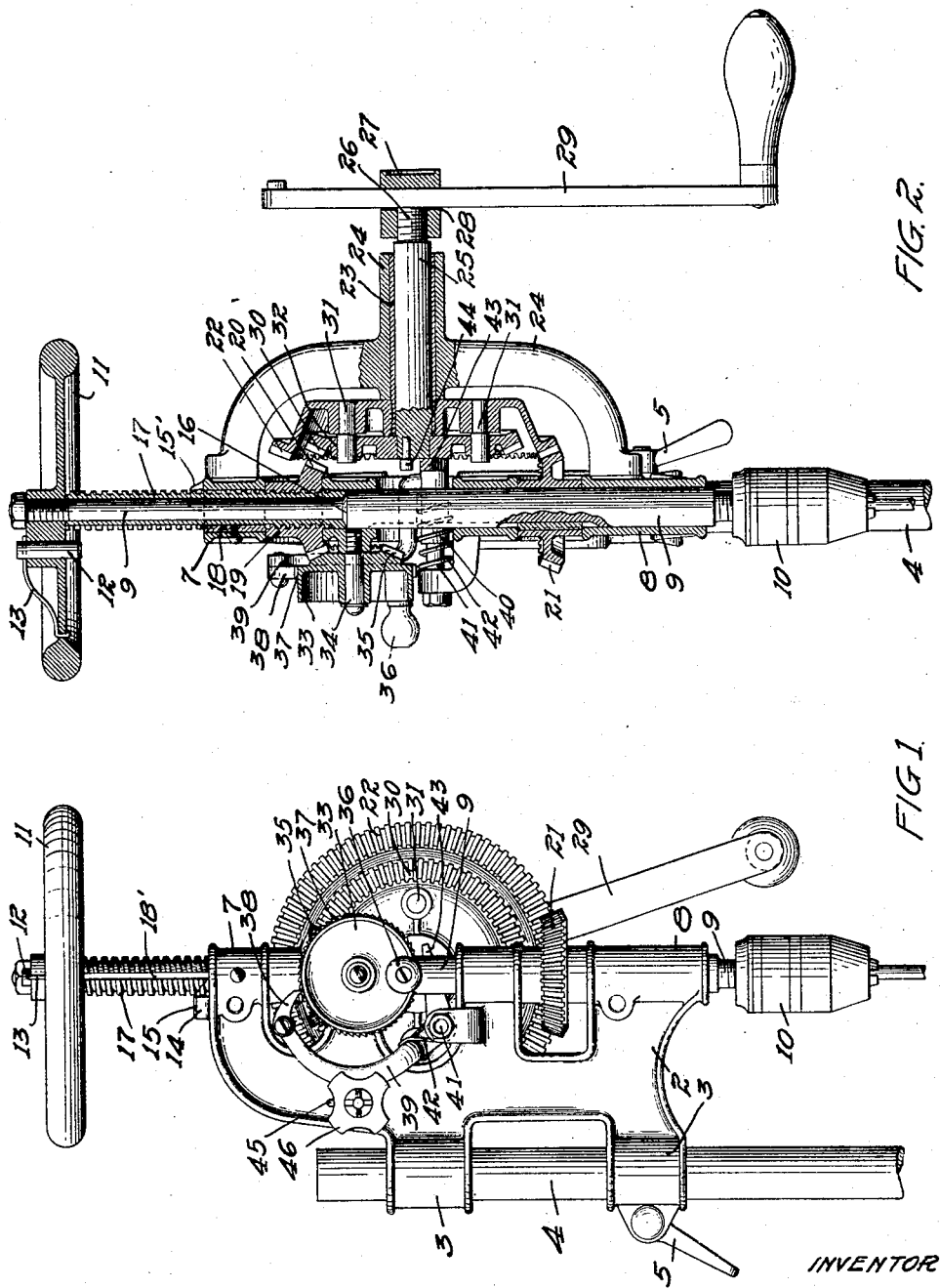

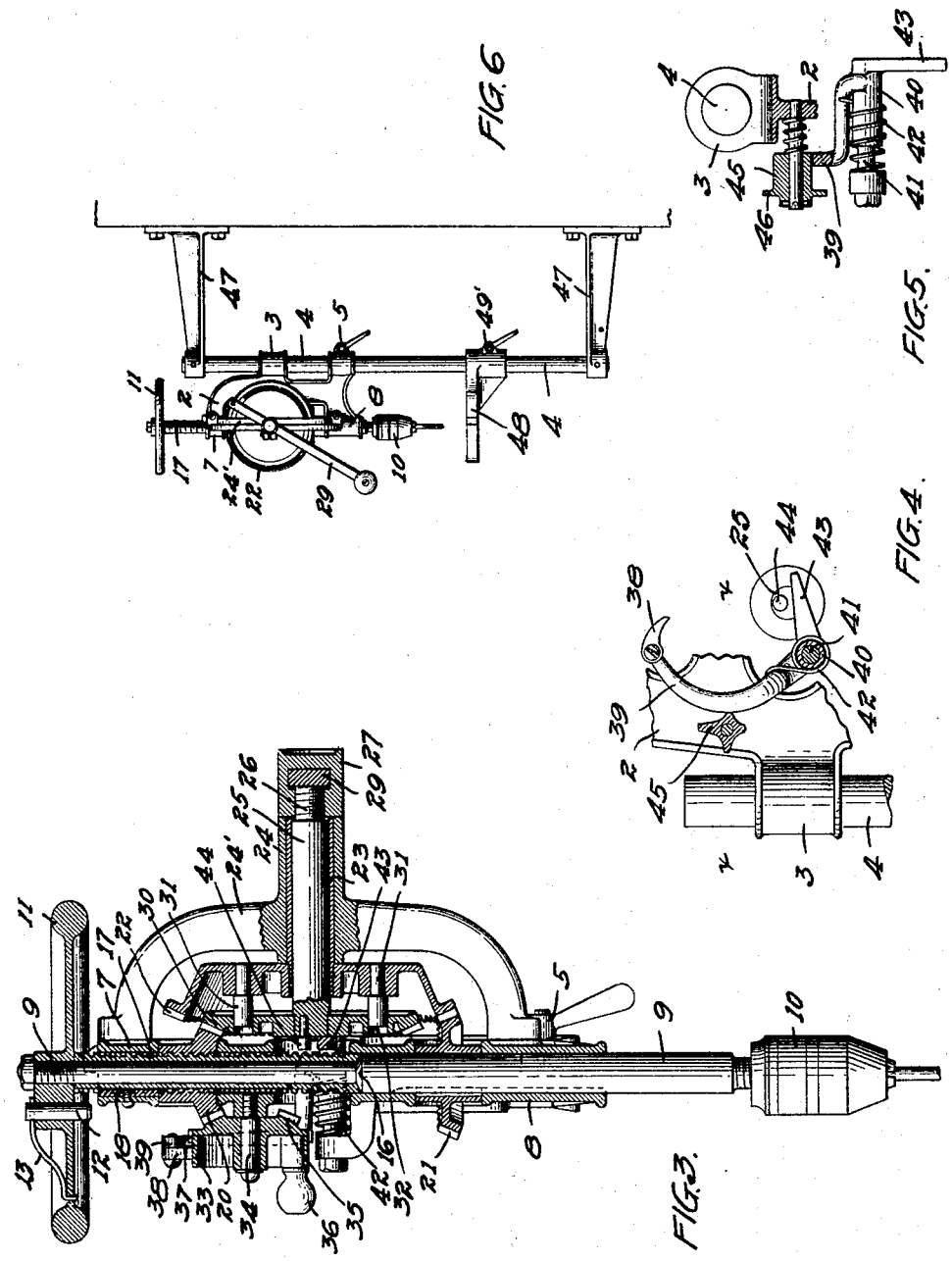

UNITED STATES PATENT OFFICE.

JOHN KOWALSKY, OF MINNEOTA, MINNESOTA.

BENCH-DRILL.

1,198,854. Specification of Letters Patent. Patented Sept. 19, 1916.

Application filed August 7, 1915. Serial No. 44,311.

*To all whom it may concern:*

Be it known that I, JOHN KOWALSKY, citizen of the United States, resident of Minneota, county of Lyon, State of Minnesota, have invented certain new and useful Improvements in Bench-Drills, of which the following is a specification.

The object of my invention is to provide improved means for revolving the drill spindle and feeding it to the work.

A further object is to provide improved means for regulating the feed or travel of the spindle.

A further object is to provide improved means for stopping the feed of the spindle at a predetermined point in its movement.

Other objects of the invention will appear from the following detailed description.

The invention consists generally in various constructions and combinations, all as hereinafter described and particularly pointed out in the claims.

In the accompanying drawings forming part of this specification, Figure 1 is a side view of a bench drill embodying my invention, Fig. 2 is a vertical sectional view of the same, Fig. 3 is a view similar to Fig. 2, showing the parts in position for feeding the drill spindle, Fig. 4 is a detail view of the device for regulating the feed, Fig. 5 is a sectional view on the line $x$—$x$ of Fig. 4, Fig. 6 is a side elevation, showing one mode of mounting the drill on its support, Fig. 7 is a similar view, showing the conventional manner of mounting the drill on a bench, Fig. 8 is a horizontal sectional view of the work support, Fig. 9 is a view illustrating the device removed from its support and adapted for use as a breast drill.

In the drawing, 2 represents the frame of the drill, having bearings 3 on an upright standard 4 and a clamp device 5 for securing the frame to the standard. Said frame has bearings 7 and 8 for a drill spindle 9 on the lower end of which a tool carrier 10 is mounted. At the upper end of the drill spindle is a hand wheel 11. A stop pin 12 is mounted to slide vertically in the hub of the wheel 11 and is normally held in its depressed position by a spring 13.

The bearing 7 has a lug 14 thereon in the path of the pin 12 and the upper end of the lug has a beveled surface 15 with which the beveled lower end of the pin first contacts and riding over this beveled surface, produces a clicking sound, indicating to the workman that the tool has gone through the work, suitable adjustment having been previously made for this purpose. Continued movement of the drill spindle will cause the pin 12 to contact with the square lower face of the lug and positively stop the movement of the spindle. The opposite face of the lug has another beveled surface 15' which allows the pin to ride over it when the wheel is revolved in the opposite direction to raise the spindle.

The spindle is provided with a shoulder 16 between which and the hub of the wheel 11 I prefer to provide an exteriorly threaded sleeve 17. This sleeve is held against rotary movement by a key 18 mounted in the bearing 7 and engaging a key-way 18' in said sleeve. The hub 19 of a gear 20 is interiorly threaded to engage the threads of the sleeve 17 and is mounted thereon below the bearing 7. Obviously, when this gear is revolved it will follow the threads of the sleeve and the sleeve, being held against rotary movement, will feed vertically and move the spindle to advance or retract the tool holder.

The pinion 21 has a key-seat on the spindle 9 between bearings in said frame and meshes with a beveled gear 22 that is mounted on the inner end of a sleeve 23 which has bearings in a hub 24 on a yoke 24' that is fastened to the frame 2 near the bearings 7 and 8.

A driving stud or spindle 25 is slidable in the sleeve 23 and is provided with a threaded outer end 26 that is tapped into a nut 27 having a transverse slot 28 to receive an operating crank arm 29. When the end of the spindle engages the arm 29, it will be locked against longitudinal movement in the slot. As soon, however, as the nut is revolved, the arm will be released and may be moved to another position in the nut and clamped. This adjustment of the arm is for the purpose of changing its leverage on the drill spindle, increasing or decreasing it as desired, and as the character of the work may require. This manner of mounting the crank arm forms the subject matter of a companion application herewith and I make no claim to the same in this case.

At the end of the spindle 25 is a beveled gear 30. A series of pins 31 are mounted in the gear 22 and fit into sockets 32 provided in the gear 30 so that when the gear 30 is revolved, the gear 22 will be revolved also. This gear 22 meshes with a pinion 21 and when revolved will revolve the spindle and the tool holder, and at the same time the engagement of the gear 30 with the pinion 20 will move the sleeve 17 longitudinally and feed the drill spindle. A drum 33 is mounted on a pin 34 carried by the frame of the drill and provided with a pinion 35 which meshes continuously with the pinion 20, said drum having a hand grip 36 for convenience in turning it and the feed pinion by hand. The periphery of the drum is provided at its inner edge with ratchet teeth 37 engaged by a dog 38 carried by an arm 39 that is mounted on a sleeve 40 that is mounted to slide on a bolt 41 against the tension of a compression spring 42. The sleeve 40 has a finger 43 which projects into the path of a pin 44 that is eccentrically mounted in the inner end of the stud 25 in position to engage and rock the said finger with each revolution of said stud. The rocking of the finger 43 and the sleeve 40 will impart a corresponding movement to the arm 39 against the tension of the spring 42 and move the dog 38 over the teeth of the ratchet to regulate the feed of the drill spindle. The degree of this feed is, of course, determined by the stroke of the dog or the number of teeth it passes over with each movement of the arm 39. For the purpose of regulating this stroke, I provide a stop device 45 having a plurality of arms of varying length and mounted to revolve into the path of the arm 39, being provided with a suitable finger grip 46 for this purpose. By adjusting this stop, the travel of the arm 39 can be easily and quickly regulated and consequently the movement of the dog controlled to determine the number of teeth of the ratchet the dog shall pass over with each movement of the arm 39. This stroke of the arm 39 and its connections is plainly indicated in Fig. 4, where the finger 43 is illustrated in the path of the pin 44 to be positively actuated thereby to rock the sleeve 40 and the arm 39 with each revolution of the stud 25. Evidently, as soon as the pin 44 clears the finger, the spring 42 will return the rocking arm to its normal position, its travel depending upon the position of the stop device, and slide the dog over the teeth of the ratchet to again operate the ratchet and feed pinion when the pin 44 reëngages the finger 43. When the gear 30 is moved into engagement with the pinion 20, the pressure on the sleeve will move it longitudnally a sufficient distance to carry the dog 38 out of engagement with the teeth of the ratchet, as indicated in Fig. 3, and thereupon the feed will be effected directly through the gear 30 and the pinion 20 to the drill spindle. The ratchet pinion will be revolved during the engagement of the gear 30 with the pinion 20 and the dog 38 will be moved on the surface of the drum and will be out of engagement with the teeth of the ratchet and therefore inactive. This gear 30, as stated, provides a direct drive for the pinion 20 and enables the operator to move the spindle rapidly back and forth during the idle part of its travel, enabling the operator to feed the tool rapidly to and from the work. As soon as the tool is ready to enter the work, the gear 30 may be disengaged from the pinion 20 and thereupon the feed will be effected more slowly through the ratchet mechanism.

It will be noted that the spring 42 has two functions: first, to normally hold the rocking arm 39 away from the ratchet teeth and retract it when it is rocked toward the ratchet drum by the movement of the arm 43. The second function of this spring is to force the gear 30 out of engagement with the teeth of the feed pinion when the operator releases the inward pressure on the stud 25. Normally, therefore, the parts will be in the position as indicated in Fig. 2, the feed being through the pin 44 to rock the finger 43 and actuate the ratchet feed, while for quick forward or return movement of the spindle the operator may push the stud inwardly until the teeth of the gear 30 mesh with the feed pinion and in this position the ratchet mechanism will be inoperative.

In Fig. 6 the rod 4 is shown supported on suitable brackets 47. On the rod 4 a suitable work-support 48 is mounted. In other respects the mechanism shown in Fig. 6 is substantially the same as that illustrated in the previously described figures.

In Fig. 7 a supporting rod is shown, provided with a clamp 49 for attachment to a bench 50 or similar support. The work support 48 is illustrated in Fig. 8 provided with a suitable clamping means 49' and having a flattened surface on which the work is placed.

In Fig. 9 the device illustrated in Fig. 7 is shown, with the drill reversed on the rod 4, and thereby the tool becomes adapted for use as a breast drill, the operation of the parts being substantially as described with respect to the previous figures.

I claim as my invention:

1. A drill comprising a frame, a spindle mounted therein for rotary and longitudinal movement, revolving and feed pinions for said spindle, a longitudinally movable stud, a gear meshing with said spindle-revolving pinion, and a driving gear for said feed pinion mounted on said stud and adapted to mesh with said feed pinion through longitudinal movement of said stud.

2. A drill comprising a frame, a spindle mounted therein, revolving and feed pinions for said spindle, a gear meshing with said spindle-revolving pinion, a stud having a revolving and a longitudinal movement, a gear connected with said first named gear and mounted to be moved into or out of engagement with said feed pinion by the longitudinal movement of said stud.

3. A drill comprising a frame, a spindle mounted therein, revolving and feed pinions for said spindle, a gear meshing with said spindle-revolving pinion, a stud mounted for longitudinal and rotary movement, a gear carried by said stud and movable into and out of mesh with said feed pinion by the longitudinal movement of said stud, and a driving connection between said gears.

4. A drill comprising a frame, a spindle mounted therein, revolving and feed pinions for said spindle, a gear meshing with said revolving pinion, a stud mounted for rotary and longitudinal movement, a gear carried thereby and having sockets therein, pins mounted in said first named gear and slidable in said sockets for simultaneous movement of said gears, said stud gear being normally out of engagement with said feed pinion but meshing therewith by longitudinal movement of said stud in one direction.

5. A drill comprising a frame, a spindle mounted therein, revolving and feed pinions for said spindle, a driving gear for said spindle-revolving pinion, a stud mounted for rotary and longitudinal movement, a gear carried by said stud for meshing with said feed pinion and normally out of engagement therewith, a ratchet mechanism normally connected with said feed pinion and actuated by the revolution of said stud, and means for rendering said ratchet mechanism temporarily inoperative by the longitudinal movement of said stud.

6. The combination, with a spindle and a feed pinion therefor, of a stud having a rotary and longitudinal movement, a gear mounted for engagement with said pinion upon the longitudinal movement of said stud and normally out of engagement therewith, a ratchet device connected with said feed pinion and actuated by the revolution of said stud for feeding said spindle, said ratchet mechanism having means for rendering it inoperative through the longitudinal movement of said stud.

7. The combination, with a frame, of a spindle mounted therein and a feed pinion therefor, a gear mounted for engagement with said feed pinion, a ratchet mechanism connected with said feed pinion and having means for normally holding said gear out of engagement therewith, said gear having means for operating said ratchet mechanism, and means for rendering said ratchet mechanism inoperative when said gear is moved into engagement with said pinion.

8. The combination, with a frame and a spindle mounted therein and a feed pinion for said spindle, of a ratchet mechanism for said feed pinion, including an arm and dog carried thereby and a ratchet wheel for said dog, a sliding sleeve, a spring mounted for resisting longitudinal movement of said sleeve and for retracting said ratchet arm, a gear mounted to mesh with said feed pinion and normally held out of engagement therewith by the pressure of said spring, said gear having means for rocking said sleeve and operating said ratchet arm against the tension of said spring when said gear is revolved.

9. A drill comprising a frame, a spindle mounted therein, a feed pinion therefor, a ratchet wheel geared to said pinion, an arm having a dog engaging the teeth of said ratchet wheel, said dog being capable of movement with said arm out of engagement with the teeth of said ratchet, and a gear mounted for engagement with said feed pinion and normally out of mesh therewith and having means for operating said ratchet mechanism.

10. The combination, with a spindle and a feed pinion therefor, of a ratchet drum geared to said pinion, a rocking arm and dog therefor in engagement with the teeth of said ratchet drum, a sliding sleeve whereon said arm is mounted, means normally resisting the rocking of said arm and the longitudinal movement of said sleeve, and a direct drive for said feed pinion mounted to move said sleeve longitudinally and said dog out of engagement with the teeth of said ratchet.

11. The combination, with a spindle and a feed pinion therefor, of a ratchet feed, a longitudinally movable driving stud, a gear normally out of mesh with said feed pinion but mounted to mesh therewith through the longitudinal movement of said driving stud, and mechanism for temporarily rendering said ratchet feed inoperative when said gear is moved into mesh with said feed pinion.

12. The combination, with a spindle and a feed pinion therefor, of a ratchet drum geared to said feed pinion, a rocking arm and a dog carried thereby to engage the teeth of said ratchet drum, means for rocking said arm to move said dog over the teeth of said ratchet, and a revolving device having radiating arms of different length for regulating the stroke of said arm and the travel of said dog.

13. A drill comprising a frame, a spindle mounted therein for rotary and longitudinal movement, revolving and feed pinions for said spindle, a gear normally meshing with said revolving pinion, a second gear having a driving connection with said first named gear and normally out of mesh with said feed pinion, and means for revolving said second gear and meshing it with said feed pinion.

14. A drill comprising a frame, a spindle mounted for rotary and longitudinal movement, revolving and feed pinions for said spindle, concentrically mounted gears, one of them normally meshing with said revolving pinion and another gear normally out of mesh with said feed pinion and having a driving connection with said revolving pinion gear, and means for revolving said feed pinion gear and moving it into engagement with said feed pinion.

15. A drill comprising a frame, a spindle mounted therein, a revolving pinion and a feed pinion, a driving stud fixed to one of said pinions, the gear for said feed pinion being normally out of engagement therewith, a ratchet feed mechanism for said feed pinion operated by the revolution of said stud, the longitudinal movement of said stud engaging said feed pinion gear with said feed pinion and rendering said ratchet feed temporarily inoperative.

16. A drill comprising a frame, a spindle mounted therein, a feed pinion, a ratchet feed device for said pinion, a stud having means for normally operating said ratchet feed mechanism, a gear mounted on said stud and normally out of engagement with said feed pinion, longitudinal movement of said stud engaging said gear with said feed pinion, yielding means actuated by the longitudinal movement of said stud for rendering said ratchet feed temporarily inoperative, said ratchet feed becoming automatically operative when said stud is withdrawn and said feed pinion gear disengaged from said feed pinion.

17. The combination, with a frame, of a spindle mounted therein and a feed pinion therefor, a gear mounted for engagement with said feed pinion, a ratchet feed mechanism connected with said feed pinion, means for rendering said ratchet mechanism inoperative when said gear is moved into engagement with said pinion and returning said ratchet mechanism to its normal operative position when said gear is withdrawn from engagement with said pinion.

18. In a drill, a spindle, revolving and feed pinions therefor, a driving gear for said spindle-revolving pinion, a gear for said feed pinion normally out of engagement therewith, a ratchet mechanism normally connected with said feed pinion and actuated through the operation of said driving gear for the slow working feed of said spindle, and means for rendering said ratchet mechanism temporarily inoperative when said feed gear is engaged with its pinion for a rapid return of said spindle.

In witness whereof, I have hereunto set my hand July 24 1915.

JOHN KOWALSKY.